Sept. 19, 1950 G. R. ERICSON 2,523,105
VARIABLE COMPRESSION ENGINE
Filed April 15, 1946 3 Sheets-Sheet 1

INVENTOR
George R. Ericson

Patented Sept. 19, 1950

2,523,105

UNITED STATES PATENT OFFICE 2,523,105

VARIABLE COMPRESSION ENGINE

George R. Ericson, Kirkwood, Mo.

Application April 15, 1946, Serial No. 662,243

3 Claims. (Cl. 123—48)

1

This invention relates to improvements in internal combustion engines, and has particular reference to the provision of means including a mounting arrangement of the engine cylinder assembly, affording automatic regulation of cylinder compression proportionately to and in accordance with throttle positioning as well as variations in engine speed and loading, whereby to improve the operating efficiency and power output of the engine under all working conditions. The present improvements are suitable in particular, to engines which in normal operation, are subject to relatively wide variation in speed and loading, as for example, engines for automotive use and the like.

In an automotive engine of conventional character, wherein the compression clearance of the cylinder combustion space is constant for all engine operating conditions, the effective or peak compression pressure varies in proportion to the volumetric intake of fuel charge. Thus in the conventional engine where in the interest of good thermal and operating efficiencies at high or maximum power output, the clearance is selected or determined in the design of the engine, such as to afford with due regard to the avoidance of pre-ignition and detonation, a degree of compression most appropriate to the relatively large volumetric intake of fuel charge obtaining under heavy or full loading with the throttle near or at full open position, it will be obvious that the peak compression pressures obtaining when the engine is operated under light or intermediate loads at various speeds and with the throttle only partly open, will be correspondingly less in direct proportion to the smaller volumetric intake of fuel charge occurring under the latter conditions. Consequently, the combustion and power capacities of the smaller fuel charges are not fully realized in the latter instances, to the detriment of engine efficiency and power output under these conditions.

Accordingly, it is an object of the present invention to provide an engine wherein the capacity of the cylinder compression space is variable in proportion to volumetric intake of fuel charge, whereby to afford a peak compression pressure appropriate to the particular fuel charge admitted under any throttle position and any condition of engine speed and loading.

Since the volume of fuel charge entering a cylinder is determined in large part, by the degree of intake manifold vacuum, and further since the manifold vacuum is directly reflective of the engine speed and load conditions as well as

2 the position of the throttle, it is a further object of the invention to utilize intake manifold pressure or vacuum as the controlling agency or influence in the automatic regulation of cylinder compression as facilitated by the novel provisions presently to be described.

Other objects and advantages of the present invention will appear readily from the following description of a presently preferred embodiment thereof, as such is exemplified in the accompanying drawings, wherein.

Figure 1:
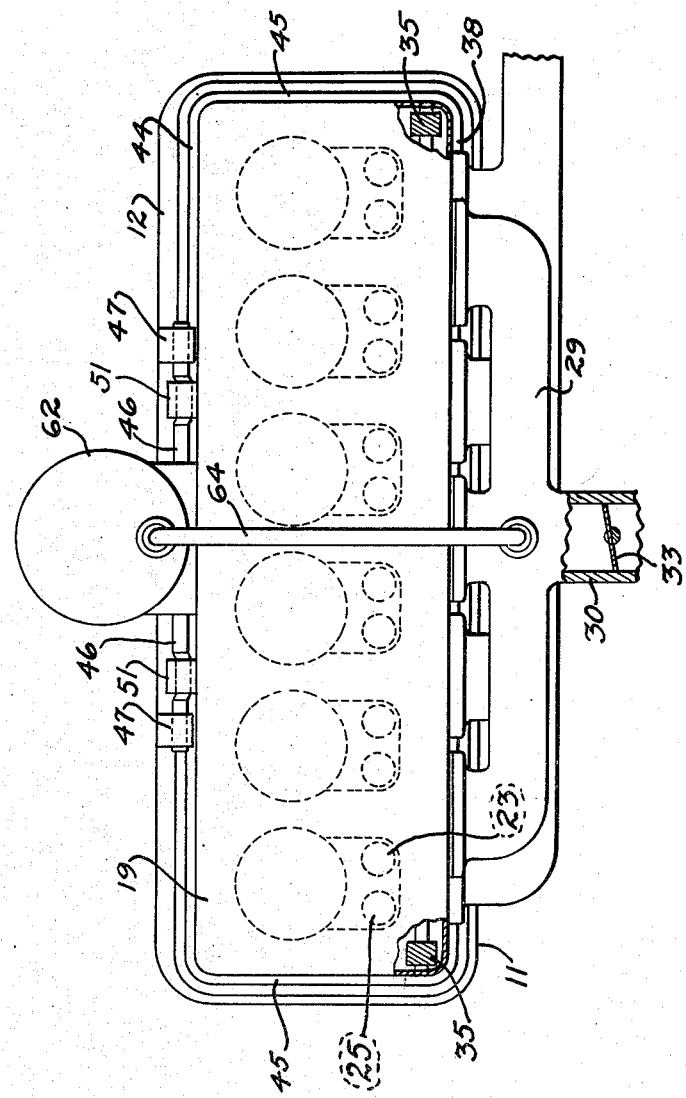
Fig. 1 is a somewhat diagrammatic plan view of an internal combustion engine embodying the invention, parts thereof being broken away and in section to illustrate certain of the features of present improvements.
Figure 2:
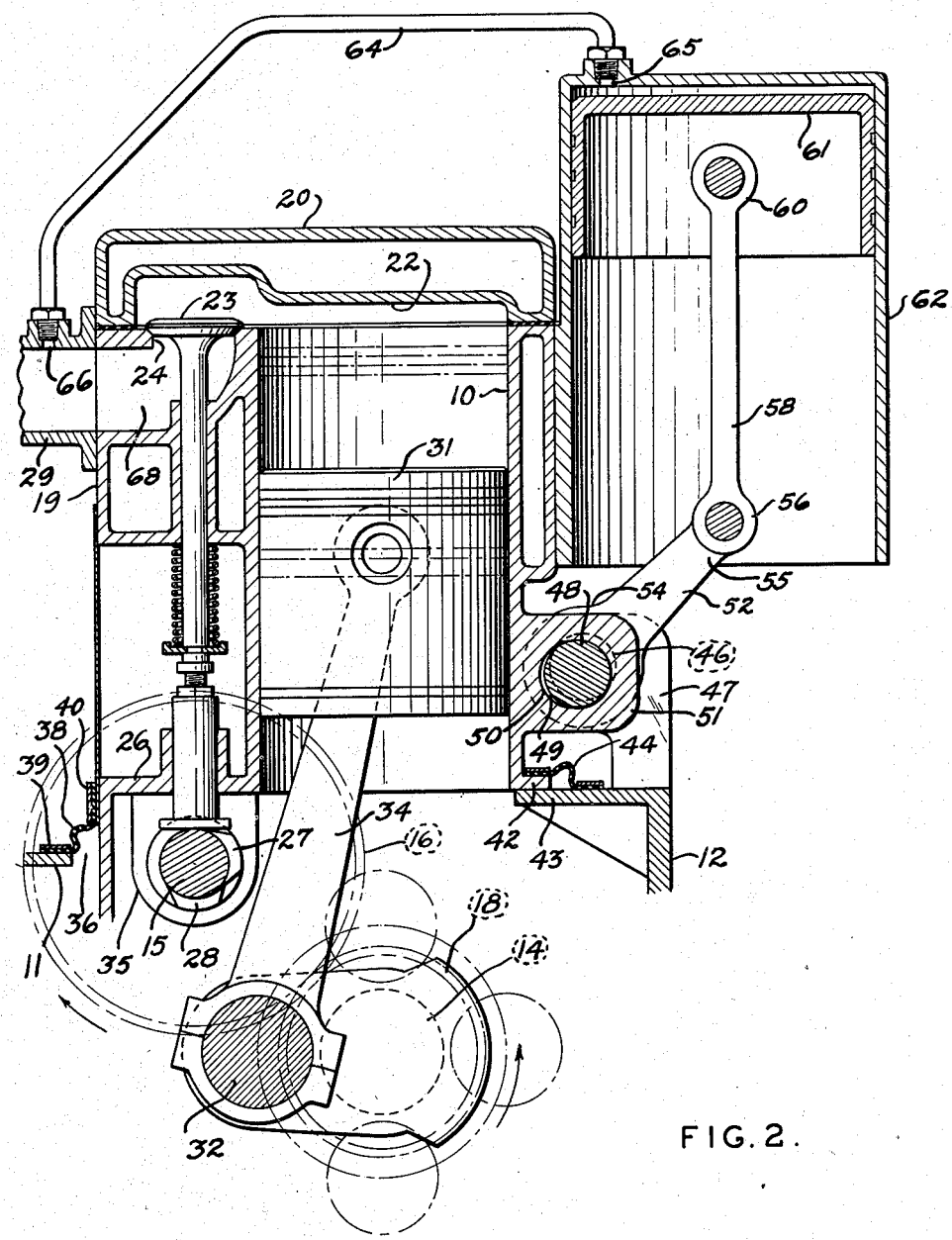
Fig. 2 is a vertical section through a cylinder of the engine, showing the principal features of the present improvements, the view illustrating the condition of the cylinder in which the compression clearance is at a minimum.
Figure 3:
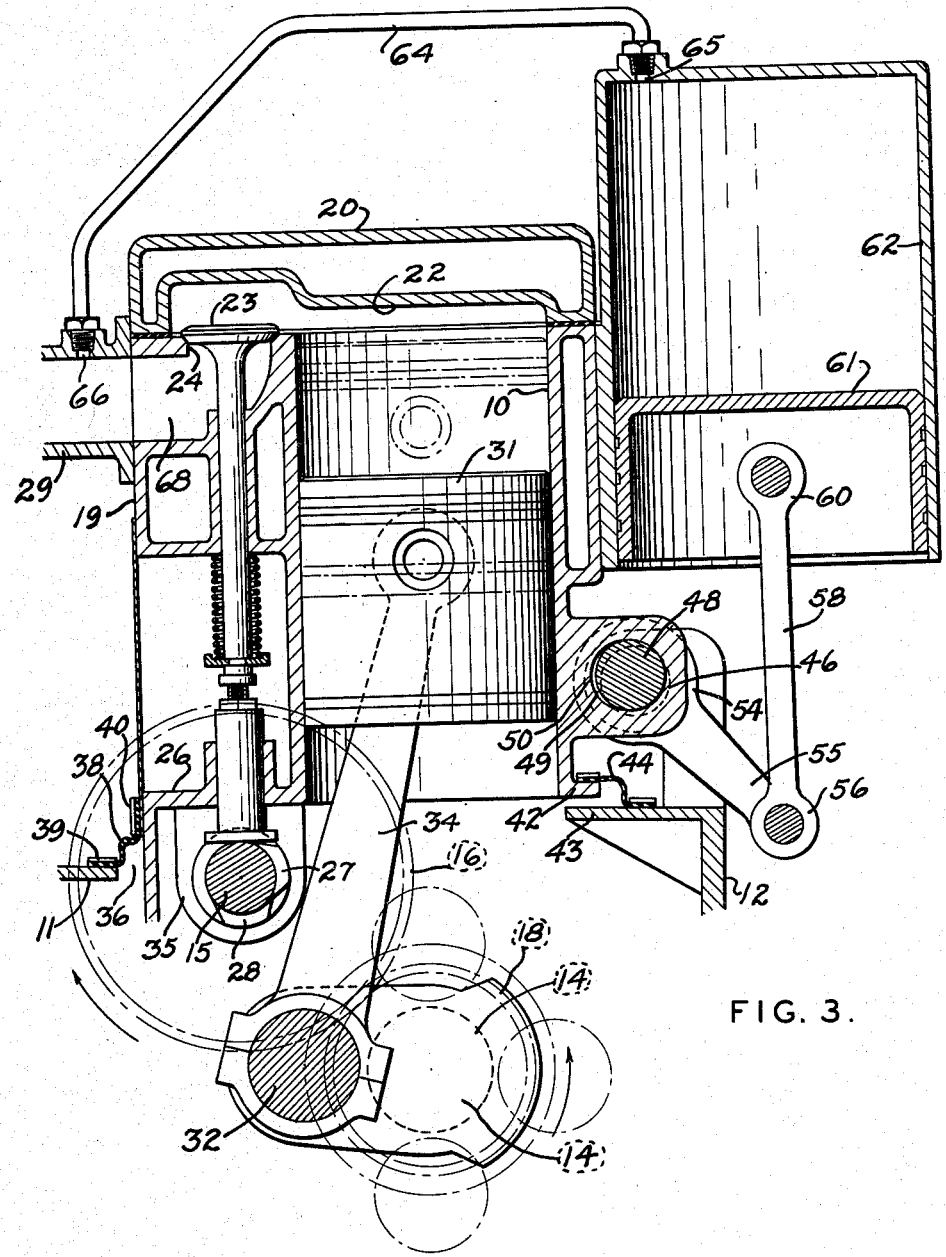
Fig. 3 is a sectional view similar to that of Fig. 2, but showing the condition of the cylinder wherein the compression clearance is at a maximum.

Referring to the drawings, the engine shown diagrammatically in Fig. 1 and now to be described, may be considered for the purpose of present example, to be a multi-cylinder automotive engine, only one cylinder of which is here shown in section in Figs. 2 and 3 and designated by the numeral 10. In the construction of the engine, the crankcase not shown in entirety but indicated in fragmentary parts at 11 and 12 in Figs. 2 and 3, and in top outline in Fig. 1, is formed as a separate structure, and operatively supported therein are the engine crankshaft 14 and the intake and exhaust valve camshaft 15, the latter preferably being located near the upper end of the crankcase and relatively adjacent the side portion 11 thereof. Drive of the camshaft is here effected through a gear 16 on the camshaft, enmeshing a drive pinion 18 on the crankshaft, the gear and pinion appearing in broken outline only, and for a four-cycle automotive engine, presenting a gear ratio of 2:1 to afford the required one-half speed rotation of the camshaft.

In accordance with the present improvements, the cylinder assembly is provided as a complete unit, separate from the crankcase, and comprises a unitary frame or cylinder block 19 providing in the present example, in-line cylinders appearing in broken outline in Fig. 1, and one of which is shown at 10 in section in Figs. 2 and 3, and further providing a head structure 20 presenting a cylinder head 22 for each cylinder. Operatively carried by the block 19 is an intake control valve 23 for each cylinder, in control of the cylinder intake port 24, the valve stem projecting through the lower longitudinal side portion 26 of the block for cam actuation thereof by the inlet valve cam 27 on camshaft 15. Similarly, an exhaust valve (not shown except as indicated at 25 in Fig. 1) at each of the cylinders, is operatively carried by the block and extends for actuation by the exhaust cam 28. The engine intake manifold is shown at 29 in Fig. 1, and includes a central neck 30 to which the carburetor (not shown) is connected. For the present purposes, the engine throttle valve is shown at 33 in neck 30.

The numeral 31 indicates one of the engine pistons operative in the cylinder 10 shown, the piston being connected in the usual manner to a crank arm 32 of the crankshaft 14, as by a connecting rod 34, such as to have a fixed stroke relative to the cylinder.

The cylinder assembly provided as a complete unit apart from the crankcase assembly, is supported for pivotal displacement relative to the latter and about an axis off-set from the axis of piston displacement or otherwise stated, from the longitudinal center of the engine. In the present example, the cylinder unit is most advantageously and conveniently pivotally mounted on the camshaft 15 as an axis, by bracket members 35 (Fig. 1) depending from the ends of the cylinder block portion 26 (Fig. 2) and pivotally seating on the camshaft. If desired, although not here shown, one or more additional intermediately located brackets may be applied between the cylinder block and camshaft to assure firm pivotal support of the cylinder unit. Furthermore, the block side portion 26 is spaced sufficiently inwardly from the crankcase marginal portion 11, to clear the latter upon pivotal displacement of the cylinder block. As a means for sealing the crankcase in the clearance space 36, against the entrance of foreign matter as well as discharge of crankcase oil therethrough to the engine exterior, a suitable flexible member or diaphragm 38 is arranged lengthwise of the crankcase, and one longitudinal margin 39 thereof is sealingly secured or clamped upon the crankcase margin 11, while its opposite longitudinal margin 40 is similarly clamped to the block side portion 26.

Extending longitudinally of the block 19 on the opposite side and at the lower edge thereof, is an outstanding flange 42 which under certain conditions, as will appear hereinafter, rests upon the inwardly directed wall portion 43 of the crankcase part 12, the latter serving as a stop to limit pivotal displacement of the cylinder block assembly in the clockwise direction as viewed in Fig. 2. Similarly to the seal at the camshaft side, the crankcase at the wall 43 is sealed by a flexible diaphragm 44 along the engine and sealingly secured to crankcase wall 43 and to the cylinder block flange 42. Also, a like seal 45 (Fig. 1) is provided at each end of the crankcase, in connection with the corresponding end of the cylinder block. Thus the indicated flexible sealing members between the crankcase and cylinder block maintain the desired closure of the crankcase while permitting displacement of the cylinder assembly relative to the latter, in a pivotal manner about the camshaft as an axis.

Pivotal movement of the cylinder assembly is here effected through a shaft member 46 shown in Fig. 1 and indicated in dotted outline in Fig. 2, the shaft being suitably rotatably supported by bearing standards such as the standards 47 shown upstanding on the crankcase wall 43, and carrying or formed to provide spaced camming elements or eccentrics 48. Each of the eccentrics is received through a somewhat oval-form opening 50 in a projection or boss 51 preferably integral with and extending laterally from the cylinder block 19, the opening 50 affording a small clearance relative to the cooperating eccentrics, as at 49, to accommodate pivotal movement of the cylinder unit.

If desired, the shaft 46 may be relatively short such as to provide only one eccentric 48, with the latter and cooperating cylinder boss 51 located preferably near the longitudinal center of the block 19, or the shaft may be extended to afford a plurality of like eccentrics coacting with cylinder bosses, as 51, suitably relatively spaced along the length of block 19. A shaft operating arm 52 has its hub 54 keyed or otherwise secured to shaft 46, and its outer end 55 pivotally connected to one end 56 of a rod 58. The opposite end 69 of rod 58 is similarly pivotally connected to a piston 61 reciprocable in a cylinder 62, the cylinder being rigidly secured to the cylinder block 19. A conduit 64 connects a port 65 in the top of cylinder 62, with the engine intake manifold 29, as at 66, between the engine throttle 33 and the engine cylinder intake passages, one of which appears at 68.

Since only a relatively small range of pivotal displacement of the cylinder unit is here necessary to afford compression adjustment suitable to the fuel charge admitted under any condition of throttle position and engine speed and loading, the degree of eccentricity of the camming elements or eccentrics 48 relative to the axis of shaft 46, is correspondingly small, as indicated in Figs. 2 and 3. Consequently, the present cylinder unit displacement control affords a decided mechanical advantage in favor of the suction actuated device provided by the piston 61 and cylinder 62 in suction communication with the engine intake manifold, which thus facilitates effective control of cylinder unit positionment in direct accordance with intake manifold pressure or vacuum, as this will appear more fully hereinafter.

Before describing the operation of the presently improved compression control arrangement, it is to be noted here that the pivotally raised position of the cylinder assembly, as shown by Fig. 3, being one extreme of cylinder positioning, is that which may obtain under the condition of full load, wide open throttle operation of the engine, when the volumetric intake of fuel charge is relatively large. Accordingly, in the construction of an engine embodying the present improvements, the peak compression clearance between the coacting piston and cylinder head surfaces may be determined as to this cylinder position but with due regard however, to the opposite extreme of cylinder position as in Fig. 2, to afford a degree of peak compression which is most suitable to the large volume intake of fuel charge occurring under the above condition.

During operation of the engine, the peak compression and combustion pressures in the several cylinders and reacting on the cylinder heads 22, will tend to lift the cylinder assembly about its pivotal support on the camshaft, and in so doing, will tend to turn the shaft 46 through the lifting reaction on the eccentrics 48, such as to pull down the piston 61 against the lifting suction in cylinder 62. Since in a multi-cylinder engine of the character herein exemplified, compression and combustion occur sequentially as to the several cylinders or in a predetermined regular order of cylinder firing, the effective cylinder unit lifting force at any instant of engine operation, is the resultant of the compression and combustion pressures obtaining in those of the cylinders undergoing peak compression or combustion at the time. Consequently, throughout engine operation the cylinder unit is subjected to a resultant or mean effective cylinder force or pressure tending to lift the unit. In the present invention, such mean effective pressure is utilized through reaction on the eccentrics although in reduced effect thereon, as will presently appear, in opposition to the intake manifold pressure as the controlling influence, to determine cylinder unit positionment in the regulation of cylinder compression. Through the present mounting arrangement of the cylinder assembly as a unit, affording a pivotal support or anchorage thereof along one longitudinal side of the unit and appreciably off-set from the axis of piston displacement, it will appear that very substantially less than the full mean effective cylinder pressure or force will be effective on the eccentric or eccentrics 48. Moreover, the actual force on the eccentrics resulting from the above indicated mean effective cylinder pressure is here additionally reduced by the weight of the entire cylinder assembly which acting about the camshaft as an off-center pivot, provides an appreciable force in opposition to the indicated mean effective force. Consequently, by properly designing the lever and eccentric connections between the cylinder unit and the suction piston 61 such as to provide in particular and as hereinbefore noted, an effective mechanical advantage in favor of the piston 61, and further, by determining the suction displacement capacity of the piston and cylinder suction actuated device 61—62, the mean effective cylinder force reduced in its effect upon the eccentrics 48, as above described, can be balanced with intake manifold suction acting on piston 61 such as to assure pivotal positioning of the cylinder unit in direct accordance with intake manifold pressure or vacuum under all engine operating conditions. Thus upon an increase in intake manifold vacuum, the correspondingly increased suction in cylinder 62 acting on piston 61 and through the eccentrics 48 on the cylinder unit, overcomes the opposing force on the eccentrics due to the mean effective cylinder force then present, and produces a pivotal lowering of the cylinder unit to an extent in direct accordance with the extent of manifold vacuum increase, when a condition of equilibrium will obtain between the suction in cylinder 62 and the then existing mean effective cylinder force reflected against the eccentrics. On the other hand, upon a decrease in intake manifold vacuum, the mean effective cylinder force acts in opposition to the then reduced suction in cylinder 62, to effect through the eccentrics, pivotal lift of the cylinder unit until the reduced suction balances such force, when the cylinder unit will be positioned in direct accordance with the reduced suction. From the foregoing it follows that displacement of the cylinder unit is effected by the differential of forces acting in opposition on the eccentrics 48, but with the control of cylinder unit positioning initiated by and determined in direct accordance with intake manifold pressure or vacuum.

It is to be noted further in connection with the foregoing, that the suction actuated device as constituted by the piston 61 and cylinder 62, serves additionally and most effectively as a damping expedient or dash-pot, acting to absorb pressure impulses in the opposing forces such as to assure a desirably smooth cylinder unit displacement action of the mechanism in direct response to variations in intake manifold pressure. In this respect, the suction actuated device is particularly effective in the presence of a relatively rapid and substantial change in manifold vacuum, to prevent in consequence thereof, a "hunting" operation of the mechanism productive of momentary over and under displacements of the cylinder unit.

Turning now to examples of the operation of the cylinder compression control arrangement as described, assuming the engine to be started and operating at very low throttle, as for example at no load idling speed or under light load and low speed, the intake manifold vacuum will be then relatively high and will be reflected in a correspondingly high suction in the cylinder 62, which will cause the piston 61 to assume its uppermost position as in Fig. 2. Consequently, the eccentrics 48 are thereby actuated in the direction to pivotally displace the cylinder assembly to its lowermost position, as with the flange 42 in engagement with the crankcase wall 43 (Fig. 2). In this position, the compression clearance in the cylinder is at a minimum, thereby affording a desirably high degree of compression of the rarified or small volume fuel charge admitted to the cylinder under the operating condition assumed as above indicated.

Further considering the action of the mechanism, as the throttle is opened to a greater extent, the manifold vacuum will decrease correspondingly, assuming a constant load, so that the piston 61 will lower in cylinder 62 as the cylinder assembly is pivotally raised in reaction to the mean effective cylinder pressure existing at the time of manifold vacuum decrease, until the lowered suction in the cylinder 62 and the mean effective cylinder pressure reflected on the eccentrics, are in equilibrium. The result is an increase in the peak compression clearance in the cylinder, in direct proportion to the decrease in intake manifold vacuum, which thus affords peak compression more nearly appropriate to the larger volume of fuel charge intake then occurring.

When the manifold vacuum decreases very materially or approaches a value only slightly below atmospheric pressure, as obtains for example, under the condition of full load, wide open throttle operation of the engine, the mean effective cylinder pressure then overcoming the very slight suction in cylinder 62, pivotally displaces the cylinder assembly to the extreme position shown in Fig. 3, wherein suction piston 61 is substantially at the bottom of its travel. Consequently, the cylinder peak compression clearance is now at a maximum, but as hereinbefore indicated, sufficient to afford the most effective peak compression of the large volumetric intake of fuel charge then obtaining.

In another instance, assuming the throttle to be retained in a given open position as the engine load is increased or decreased, the intake manifold vacuum will correspondingly decrease or increase respectively, in dependence upon resulting decrease or increase in engine speed. In consequence thereof and in the manner described above, the cylinder assembly will be pivotally positioned in correspondence with the manifold vacuum to adjust the peak compression to the changed volumetric intake of fuel charge. Again, in the event the engine speed changes while the engine loading remains constant at any given throttle position, the manifold vacuum will change accordingly, resulting as before, in pivotal positionment of the cylinder assembly to adjust the compression to the volumetric intake of fuel charge then obtaining.

Accordingly, it will appear from the foregoing that the present improvements provide a particularly effective compression control arrangement for automatically adjusting cylinder peak compression to the volumetric intake of fuel charge as the latter varies in response to different operating conditions of the engine. An important result of this is that more efficient combustion and greater engine power is realized under any and all throttle positions and under all speed and load conditions.

Another advantage resulting from the angular movement of the intake and exhaust valve axes about the axis of the cam shaft is that the timing of these valves is changed. Under high suction conditions, as in Fig. 2, the opening and closing of these valves will occur later than under low suction conditions, as in Fig. 3. Thus the valve timing is adjusted with the cylinder compression under different conditions.

Having now described the invention as to one preferred embodiment thereof, it is to be understood that various modifications may be made as will occur to those skilled in the art, and the exclusive use of all modifications as come within the scope of the appended claims is contemplated.

I claim:

1. In a variable compression internal combustion engine, a cylinder unit providing a plurality of cylinders and including an intake manifold and valve controlling intake manifold communication with the cylinders, a crankcase, bearings in the crankcase, a crankshaft, pistons in the cylinders and connected to the crankshaft mounted in the bearings in the crankcase, a camshaft for actuating said valves, bearing means pivotally supporting said cylinder unit on said camshaft, and control means including a fluid motor actuated in direct accordance with variations in intake manifold vacuum acting in opposition to mean effective cylinder pressure, for hingedly swinging the cylinder unit on the camshaft to vary cylinder compression.

2. The structure of claim 1 characterized in that flexible sealing means connect the free marginal edge portions of the cylinders with the crankcase.

3. The structure of claim 1 characterized in that the fluid motor is associated with a cam shaft mounted adjacent one of the side walls of the cylinders for swinging the latter on the camshaft to vary the cylinder compression.

GEORGE R. ERICSON.

REFERENCES CITED

The following references are of record in the file of this patent:

UNITED STATES PATENTS

| Number | Name | Date |
|---|---|---|
| 1,219,781 | Salisbury | Mar. 20, 1917 |
| 1,812,572 | Talbot | June 30, 1931 |
| 2,153,691 | Hironaka | Apr. 11, 1939 |
| 2,387,973 | Aspin | Oct. 30, 1945 |
| 2,433,639 | Woodruff et al. | Dec. 30, 1947 |

FOREIGN PATENTS

| Number | Country | Date |
|---|---|---|
| 5,100 | Great Britain | Mar. 1, 1911 |
| 813,503 | France | Feb. 22, 1937 |